(12) United States Patent
Keeney

(10) Patent No.: US 10,083,622 B1
(45) Date of Patent: Sep. 25, 2018

(54) MUSIC NOTATION AND CHARTING METHOD

(71) Applicant: Christopher M. Keeney, Lancaster, PA (US)

(72) Inventor: Christopher M. Keeney, Lancaster, PA (US)

( * ) Notice: Subject to any disclaimer, the term of this patent is extended or adjusted under 35 U.S.C. 154(b) by 0 days.

(21) Appl. No.: 15/618,181

(22) Filed: Jun. 9, 2017

Related U.S. Application Data

(60) Provisional application No. 62/349,838, filed on Jun. 14, 2016.

(51) Int. Cl.
  *G09B 15/00* (2006.01)
  *G10G 1/02* (2006.01)

(52) U.S. Cl.
  CPC .............. *G09B 15/004* (2013.01); *G10G 1/02* (2013.01)

(58) Field of Classification Search
  CPC ..................................................... G10G 1/02
  See application file for complete search history.

(56) References Cited

U.S. PATENT DOCUMENTS 9,754,570 B2 * 9/2017 Strachan .............. G10H 1/0025

* cited by examiner

*Primary Examiner* — Kimberly Lockett
(74) *Attorney, Agent, or Firm* — Brant Allen Hershey

(57) ABSTRACT

A music charting and notation system that is a hybrid system and method that uses some standard notation elements, while combining and implementing them in non-standard ways, as well as adding other elements that are not found in any current notation systems. This new system of music notation and charting combines enhanced functionality and greater readability for musicians who are not full-time professionals.

3 Claims, 8 Drawing Sheets

It Is Well With My Soul

FIG. 7

V3
```
        C              C/G  G/F C/E  G7/D  G  G7  C
       |/ / / /    | / / 3 4  | / / 3 4  | / / / / |
(My) sin,  oh, the bliss of this glorious   thought.

Am   E7/B Am/C  C    G/D  D    G           G7
       | / / 3 4  | / / 3 4  | / / / 4 |
(My) sin,  not in part but the whole, C      C/E  F     A7/E Dm    D7  G    G/F
       | / / / 4 | / / / 4 | / / / 4 | / / / 4 |
(Is) nailed to the cross, and I bear  it no  more.

C/E      Dm/F C/G  G  C/G  C
       | / / / 4 | / / 3 4+ | / / / / |
(Praise the) Lord,  praise the Lord,  O  my  soul
```

V4
```
        C              C/G  G/F C/E  G7/D  G  G7  C
       | / / / /  | / / / /  | / / / /  | / / / / |
(And) Lord, haste the day when the faith shall be sight. The Am   E7/B Am/C  C    G/D  D    G           G7
       | / / / /  | / / / /  | / / / / |
clouds be rolled back  as a  scroll,  The C      C/E  F     A7/E Dm    D7  G    G/F
       | / / / /  | / / / /  | / / / /  | / / / / |
trump shall resound, and the Lord shall descend,  Even C/E    Dm/F C/G  G  C/G  C
       | / / / /  | / / ♩. ♪ | / / / / |
so,  it is well  with my soul
```

FIG. 8

FIG. 9
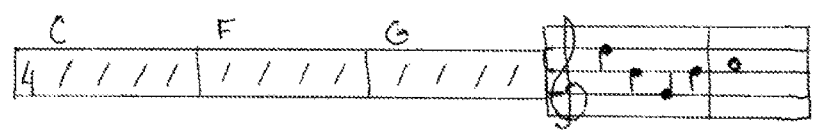
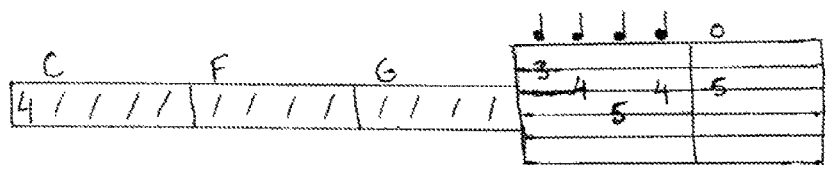

FIG. 10

MUSIC NOTATION AND CHARTING METHOD

CROSS-REFERENCE TO RELATED APPLICATIONS

This application claims the benefit of provisional patent application Ser. No. 62/349,838 filed Jun. 14, 2016 by the present inventor.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The present invention is in the technical field of music notation and charting. Music notation or charting is any system used to visually represent aurally perceived music through the use of written symbols. Particularly, the present invention is in the technical field of music notation or charting systems that combine enhanced functionality and greater readability for musicians who are not full-time professionals.

BACKGROUND OF THE INVENTION

Notation and charting systems for music generally fall into two types: standard sheet music and "lyric and chord" charts. Standard sheet music is very complete in the information it provides but often difficult for the average non-professional musician to comprehend. Lyric and chord charts are easier to comprehend but provide limited information and details. The present invention is a music notation or charting system that combines enhanced functionality and greater readability for musicians who are not full-time professionals.

SUMMARY OF THE INVENTION

This charting and notation system is a hybrid system and method that uses some standard notation elements, while combining and implementing them in non-standard ways, as well as adding other elements that are not found in any current notation systems.

One purpose of this system is to fill a niche within the musical community for musicians, songwriters, music directors, etc. to have very functional music charts that are much more complete than the commonly used 'lyric and chord' charts, and yet much more readable and understandable to the average non-professional musician than standard sheet music (also included in this category would be so-called lead sheets and jazz chord charts).

Standard sheet music that utilizes staff notation (such as would be found in normal use by an orchestra, in a hymnal, etc.) is a very complete system, but contains a large amount of information that is normally of no practical use for a rhythmic player (guitarists, bassists, some pianists depending on the context) and can be considered non-essential. Also, some of what would be considered essential information is presented in an inefficient manner, due to being used inside of a format meant to convey a large amount of other information and elements, thus potentially burying the essential parts.

In contrast, the 'lyric and chord' chart format is one in which lyrics are used as the main guide for all other information, and chords are written directly above or below these lyrics in the approximate places where they would be found in the song based on the phrasing of the lyrics themselves. Unfortunately, this format is unable to convey some of the most basic musical information, and requires outside direction of one form or another to even be usable. Most often, this takes the form of hearing a recording or performance of the song prior to using the chart, with the aim of inferring the form and phrases of said song in order to be able to then begin to interpret the information on the chart itself. Other times, a band leader, songwriter, or music director will give direction in regards to form, style, and chord duration prior to use.

Advantages of using standard sheet music include specific rhythmic information for melody and harmony parts, as well as complete measure information, rests (times when an instrument is not playing), and key and time signature markings, repeats, etc. Disadvantages include potentially lengthy page counts so as to accommodate all the required information, much unnecessary information for non-melodic players (often referred to as the "rhythm section" and typically including guitar, bass, piano, and/or percussion), and the inability to be used by musicians who are weak or unskilled notation readers. Overall, there is less "ink" on the page due to the lack of inner staff lines, makes for a much cleaner look, which in turn is helpful especially for the non-skilled music readers, since there is less to see and process.

Advantages of the 'lyric and chord' chart format include normally compact page counts, and vastly simplified notation. The disadvantages include the exclusion of even rudimentary rhythmic information, lack of written measures, and lack of chord lengths, among others.

Though each format has certain strengths, they also have significant drawbacks for use in many contexts. Seeing as neither system covers a colloquial "middle ground" between either extreme, the disclosed new charting system and format utilizes the strengths of each one while combining them in a new physical layout with new or amended notation.

Goals:
to give coherent measure markings to the 'lyric and chord' chart format
to include rhythmic information specifically for use with the included chords on any chart
to compact a measure presentation into a significantly smaller space (height) than a standard musical staff
to give multiple options for more specific rhythmic notations, including one system utilizing many standard musical notational elements, as well as another utilizing a simple numbered beat system
to make the specific notational elements simpler and more intuitive to read, thereby benefiting the novice/hobbyist with limited or no prior notational reading knowledge In approaching the version of this system which utilizes some standard notational elements, it was determined that a few of the accepted methods of use for those elements had to be changed or amended. However, all changes that were made were determined to be more sensible for the novice user, while being easily learned and adapted by a more advanced musician. All elements were extensively tested among both novice and professional players, and the system was refined accordingly.

This charting format is very compact compared to standard sheet music, and therefore keeps page numbers (and subsequently, page turning) to a sensible minimum per song (typically 1-3 pages). But despite its more compact and streamlined presentation, it includes vastly more functional information for any user than the aforementioned 'lyric and chord' charts.

Though this has been initially developed as a replacement for the 'chord and lyric' charts, it can be also be used without lyrics to equally great effect, and was extensively tested in this regard as well.

There are inherent compromises in this system, and it is not meant as a blanket replacement for all other charts. It does, however, offer a much more complete system for non-standard sheet music, and does not attempt to replace standard staff notation in any regard.

BRIEF DESCRIPTION OF SEVERAL VIEWS OF THE DRAWINGS

FIG. 4 shows the same verse as FIG. 1, but utilizes two variants of the 'simple number' system. Variant 1 is used for the top two lines, and Variant 2 is used for the bottom line.

FIG. 5 shows a full written score for the song "God Rest Ye Merry Gentlemen" utilizing standard notation.

FIG. 6 shows the first two verses and the chorus for the traditional hymn, "It Is Well With My Soul." Verse 1 and the chorus utilize one version of the 'simple notation' system, while verse 2 uses a second variation of the same system.

FIG. 7 is a continuation of FIG. 6, and presents the 3rd and 4th verses of "It Is Well With My Soul." Verse 3 utilizes one of the variants of the 'simple number' system, while verse 4 uses the same 'simple notation' variant used for verse 2, with the additional edit of shifting the positions of the pickup syllables at the beginning of each line.

FIG. 8 shows a full written score for the song "It Is Well With My Soul" utilizing standard notation.

FIG. 9 shows 2 examples of blending the comp chart format with traditional notational elements. Example 1 has three bars of comp chart measures, and then two measures of traditional staff notation. Example 2 also has three bars of comp chart measures, and then 2 measures of guitar tablature.

FIG. 10 shows a section of the song "Majestic," and incorporates 'style index' labels (A5, A9), in addition to the normal comp chart elements.

DETAILED DESCRIPTION OF THE INVENTION

Figure 1:
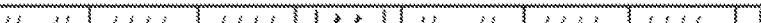
FIG. 1 shows one verse of the song "God Rest Ye Merry Gentlemen" done using the 'simple notation' system.

Elements:

Compressed (compact) staff—A "plain" rectangular box which is divided into measures in the same way as a standard staff. It includes no staff lines, as notes are all written at the same level and provide only rhythmic information. Approximately half the height of a standard staff.

Beats-per-measure number—A single number, generally in bold font, at the beginning of a chart which acts as a substitute for a traditional time signature. This numbers denotes the number of beats in each subsequent measure, and they may be included in any additional measures to signal a change in beat number.

Parentheses around pick-up syllables—Any syllables or words that occur before the downbeat of a measure which begins a new line are put in parentheses to denote that they occur before the first beat of that measure. The implication is that whatever is the first syllable NOT in parentheses occurs on the first beat. This is done to begin each song section where these pickup notes occur, but may also be used at the beginning (furthest left side) of any staff/measure which begins a new line, regardless of the section within which it is contained.

Section brackets—Vertical brackets running on the left side of each section of music (i.e. verse, chorus, etc.) which are marked with a one- or two-letter label (V for verse, C for chorus, etc.), giving clear visual reference of the location of these sections.

"Fat" notes—based on standard musical notes, but with stems that are approximately half as tall as standard notation stems, as well as using enlarged heads. These structural changes of the note shape aid in quick reading/identification in this format, due to the compact nature of the staff itself.

Mixed notation—One or more measures of either standard staff notation or guitar/bass tablature, which can be inserted wherever necessary within a comp chart.

"Simple Notation" system—A notation system which uses standard notational elements, but utilizes rest markings in a non-standard way. All rests are written out as individual beats (i.e. quarter rests) unless eighth rests are necessary. No half-note, dotted, or whole note rests are used (which would be 2, 3, or 4 beats of rests, respectively). This is to give clear visible reference of how many beats are in each measure, for clarity with counting.

"Simple Number" system—A notation system which uses basic whole numbers (1, 2, 3, etc.) for each beat, with a "+" to denote a split into eighth notes (for instance, "1+2+" has the same length value as "1 2"). It may also be split into sixteenth notes with the addition of "e" and "a" (for instance, "1e+a 2e+a" has the same length value as "1+2+" and "1 2"). A dot "." is included above every beat or division of a beat which is played. If a note is held, a line with an arrow is written beside the dot, and is as long as the duration of the note (for instance, if a note is held for 3 beats, the arrow would extend for two additional beats after the dot denoting that a note starts). There are variations of this "simple number" system. One version of the 'simple number' system can include numerical values for beats which are played (with beats that have rests remaining unlisted).

Chord rhythm slashes—Slashes which denote general rhythms within measures that don't need more specific notation.

Standard notation—Standard musical notation, as is used with a traditional staff. Can still be used with a comp chart.

Chord symbols—Any type of standard or non-standard chord symbols may be used.

For charts with lyrics, the lyrics themselves no longer need to completely line up with the chords, since the measures provide much clearer chord locations and durations.

One or more measures of traditional staff notation and/or tablature may be included within any given chart at the discretion of the transcriber. This is to accommodate the compromise of not using a standard staff for the rhythm parts of the chart, but occasionally needing a specific melodic/harmonic line to be played which cannot be properly notated on the compact staff. One very powerful use of this is to write out a melody that is played in unison between multiple instruments at the end of line or phrase. Or, use for a guitar or piano line that is used as an intro for a song, and then revert to the basic format once the verse starts. This has been found to work extremely well in practice with both professionals and novice players.

EXPLANATION AND EXAMPLES

For the purposes of a first explanation and reference for the varied elements within this system, a single verse of the traditional Christmas song 'God Rest Ye Merry, Gentlemen' is included, using a contemporary chord arrangement. As previously mentioned, the building block of the format is a three-tiered setup: the compact or compressed staff which includes all rhythmic information, chord symbols above the staff in positions directly relating to the rhythmic information within the staff, and the lyrics written underneath the staff.

For the lyrics, the main tenant is that all syllables corresponding with pickup notes which occur before the downbeat of the first measure of each section or line are placed in parentheses. In this manner, the first syllable which is not in parentheses corresponds with the first beat of that measure. This is for quick visual reference for the user, and helps to give a clear indication of the starting point of each line where it is used. If no pickup notes are present, no parentheses are used. For the rest of the line, lyrics may be shifted around slightly in order to aid with non-specific formatting issues (i.e. allowing the lyric lines to roughly correspond with where they would fall in relationship with the chords, should they have been notated completely). This rough approximation, without attempting to exactly line up phrases with the chords (other than for the first syllables of each line) is what allows the format to stay compact. The length of each measure is therefore primarily determined by the notation within it, and not the lyrics underneath. In this way also, the lyrics do not need to be in as large of a font as is typically used in the 'chord and lyric' chart format, unless they need to be clearly readable (for instance, for musicians who are also singing while playing), since they are more for reference rather than heavy use, by instrumentalists.

The chords above the staff can be written in any standard format, with the only major consideration being the space needed for each chord symbol, as they must line up with the rhythmic elements within the staff. Due to this consideration, shorter abbreviations are preferred over longer ones (it would be suggested that a 'C' minor chord would be written as 'Cm' as opposed to 'Cmin,' for instance). This consideration is well-documented in other chart forms, but is worth noting here as a continuing reference to maximizing information in a minimum amount of space (specifically in regards to page counts).

The staff itself can be within a range of sizes, though there is a diminishing return at both extremes. Too small and the included rhythmic notation cannot be easily read. Too big, and it is not saving any space compared to a standard 5-line staff. A preferred size used for testing was approximately half of the height of the standard staff. Workable sizes were found to be within about a 25% range both larger and smaller. Initial testing was done with a 24-pixel height, which was readable in a practical context, despite being on the smaller size of the aforementioned scale.

Due to the much smaller size of the compressed staff, a "fat" note is the preferred notation unit. These notes are identical in basic form to their standard staff counterparts, but have shorter stems and larger heads to aid in readability. Though a range of sizes may be used, a preferred size of approximately one quarter (25%) of the total height of staff itself has proven to be an excellent size. Standard staff notation uses note heads that completely fill up one 'space' on the staff (of which there are 4), so this size is very comparable in regards to note head size in relation to staff size.

Though there are multiple notation systems included with this format, a completely standard application of the traditional notation system will also work flawlessly. For more professional environments, this would be the preferred approach. The other systems were developed with the novice in mind, and aim to simplify and refine the information provided into a small number of elements, so as to ease learning and practical reading/application. That said, as was mentioned previously, professionals have shown a nearly immediate grasp of these "non-standard" approaches, and so they can be used in any environment where musicians are given even a modest amount of preparation time before use.

A bracket system is used for quick visual reference of sections of a song. This consists of a very narrow bracket that runs along the left side of each song section, and includes a one, two, or three letter demarcation for that section. Common demarcations are V (verse), C (chorus), PC (pre-chorus), BR (bridge), INT (intro), OUT (outro), INS (instrumental), etc. The naming and specific use of these abbreviations is at the discretion of the transcriber. This system has been found to greatly streamline movement throughout the song form in terms of performance application, as opposed to a label at the top of each section.

The reason to include both notation-based and number-based systems is in deference to the target user base. There is no doubt that the simple notation system is more powerful and complete than the number systems, but it has been shown that certain novice or non-notation-reading instrumentalists prefer a numbered system which can be referenced directly with counting (i.e. saying "1, 2, 3," etc. as a measure is being played, and being able to line up beats with the numbers that are being counted, since "one" occurs on the first beat, "two" on the second, and so on).

'Simple Notation' System

Unless otherwise stated, the basic rules of note values, uses, and abbreviations are identical to the universally used standard sheet music parameters. That said, there are some key differences as shown below.

The standard notation for rhythmic playing throughout a measure when specific rhythms are not suggested is the common or forward slash "1" symbol. The number of slashes per measure corresponds with the initial beat number (time signature equivalent). For instance, if the initial beat number is "4," there would be four slashes in each measure. Slashes may also be combined with the standard note notation, in that any portion of a measure that doesn't need specific rhythmic notation would use the slashes, and then the standard notes would be used for any specific rhythms or rests. Slashes also directly line up with chord symbols above the staff, and could presumably each have a new chord above them (though this is not typical). This format is currently used in some programs using a standard staff, and so is already an accepted system.

The main note elements used are whole notes, half notes, quarter notes, and eighth notes. Sixteenth notes (or smaller subdivisions) are, of course, also acceptable, but their complexity makes them less desirable for the simplicity intended in these charts. Triplets or other odd-note groupings are much the same as the smaller subdivisions. Using those smaller values (sixteenth notes, etc.) or odd-note groupings is much more usable and acceptable in the no-lyric versions of these charts, and/or for applications involving professional musicians. However, there are no set rules in regards to where the line of acceptability is crossed, and this is left to the transcriber's discretion.

Rests that occur in succession are written using either quarter or eighth note rests (depending what the smallest note value being used in the measure is), unless an entire measure is not played. The default value of rests is the quarter note, and eighth rests are only used when eighth notes are part of an included rhythm, and therefore eighth rests are needed to complete the correct number of beats for the measure. An example of this basic concept is that if the first 2 beats of a 4-beat measure are given using quarter notes, the remainder of the measure has two quarter rests instead of a half rest. The reasoning behind this is based on the main tenant of simplicity of elements and readability for the novice. Independent testing has found that if it is a 4-beat measure (for example), it is easier to read 4 distinct beat values than it is to combine longer values. This is mainly for the novice or non-reader, as they tend to count out beat values in quarter notes, and this approach gives them a visual reference for that.

Use of the aforementioned "fat" notes is essentially universal in this system.

Use of the aforementioned parentheses for pickup note syllables at the beginnings of lines and sections is universal in this system.

Ties between notes are used when necessary, in accordance with standard notational practices. This includes notes that are held over measure lines or for durations that cannot be easily notated otherwise.

Specifics of the 'Simple Number' System

The simple number system (all variations) is based on the commonly used practice of numbering every quarter note (or basic note value) with a whole number (1, 2, 3, etc.). The first subdivision is notated with a '+' symbol (said as "and"), and would look like "1+2+3+" etc., acting as eighth notes (or equivalent values). A third subdivision would act as sixteenth notes (or equivalent values) and use the addition of "e" and "a" as evidenced with "1e+a 2e+a" etc. Subdivisions beyond this value would not commonly be used, and in fact, most rhythms would utilize only quarter or eighth subdivisions.

The non-specific rhythmic elements are identical to the 'simple notation' system, including slashes, parentheses around pickup note syllables, bracket system, etc. The only changes are to the rhythm-specific notation devices.

Specifics of "Simple Number" Variation 1

Specific beats that are to be played are marked with a "." (dot) above the number on which the beat occurs. This is similar to the traditional notation system which uses this marking to show a staccato note (one without sustain, regardless of written note length). This is a compromise, since it has a slightly different use in this 'simple number' system than its traditional notation counterpart, but this has been found to not present a problem in practical use. On the contrary, it seems to greatly benefit the novice player's understanding of which beats are played.

Any beats played use numbers of a larger font than non-played beats (rests). A 25% or greater size difference has been found to be sufficient to easily distinguish between them, but to still allow the smaller numbers to be readable. Initial testing used numbers that were approximately half the height of the compact staff (for the played beats). This allowed ample space for clearly visible dots above the numbers.

Any number that is played is assumed to be held for the duration of that beat. If a note is shorter than the whole number (i.e. an eighth or sixteenth note), the subdivisions will be written directly after that initial number. For instance, a first beat of a measure that is held for a quarter note is simply written as "1" (with the dot above the number). If it is only meant to be held for the length of an eighth note, it would be written as "1+," with the dot above only the "1."

If a note is to be held longer than a quarter note duration, an arrow line is drawn for the length of the added duration (still using the dot above the beat number). For instance, a half note value that is played on the first beat of a measure would be written as "1" with the dot above and an arrow extending from the dot, over the smaller "2" (which denotes that it is not played additionally, and is only there as a timing device).

For odd-note groupings, an abbreviation is put in parentheses over top of the duration of the grouping. For instance, if a quarter note triplet is intended to be played over the first two beats of a measure, the abbreviation "TRP" would be written in the space where the dots would normally be, and either side of the parentheses would extend to the edges of the associated note value (so from the beginning of the first beat until the end of the second beat). The font size must be small enough to fit in the space above the numbers, but large enough to be readable (the initial testing used a font that was approximately ½ the size of the largest numbers within the measures). Odd-note groupings are rare in the context of this system due to their complexity, but they can be used. Common groupings would be triplets ("TRP") and quintuplets ("QUINT"). Since triplet is a 3-note grouping, its abbreviation is 3 letters. Quintuplet is a 5-note grouping, and so it uses a 5-letter abbreviation. Should not all the notes from these groupings be played, the letter(s) being left out of the rhythm is then not written. For example, if the fifth note of a quintuplet pattern is not to be played, the abbreviation would be written as "QUIN." This is a somewhat complicated arrangement, and is only included for the sake of completeness of the system, as its use will be extremely rare.

As with the "simple notation" system, the beat numbers may be mixed with slashes in a measure, should the need arise.

Specifics of Variation 2

All the major elements of variation 1 are retained, but the addition of parentheses around non-played (rested) numbered beats is included. This has the added benefit of differentiating between beats that are held (which do not include parentheses) and beats that are truly rests (which are always in parentheses).

Specifics of Variation 3

All the major elements of variation 1 are retained, but only beats that are played are actually written. Any rested beats are simply not included. Their assumed number values, however, are always acknowledged. For instance, if beats one and four of a particular measure are played with quarter notes, but the second and third beats are rested, the measure would include a "1" with a dot above, empty space for the rested numbers, and then a "4" with a dot above. The benefit of this particular variation is that the measures themselves have less physically written inside them, which is helpful for certain novice or non-reader players in that it gives them less to look at and process.

Figure 2:
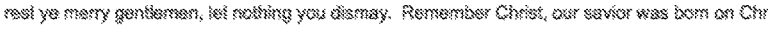
FIG. 2 shows the same verse as FIG. 1, but utilizes a chord-only version of the comp chart format, and does not include any specific rhythmic information beyond basic chord changes positions.
Figure 3:
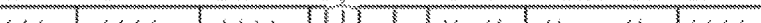
FIG. 3 shows the same verse as FIG. 1, but utilizes the third variation of the 'simple notation' system.
Figure 4:
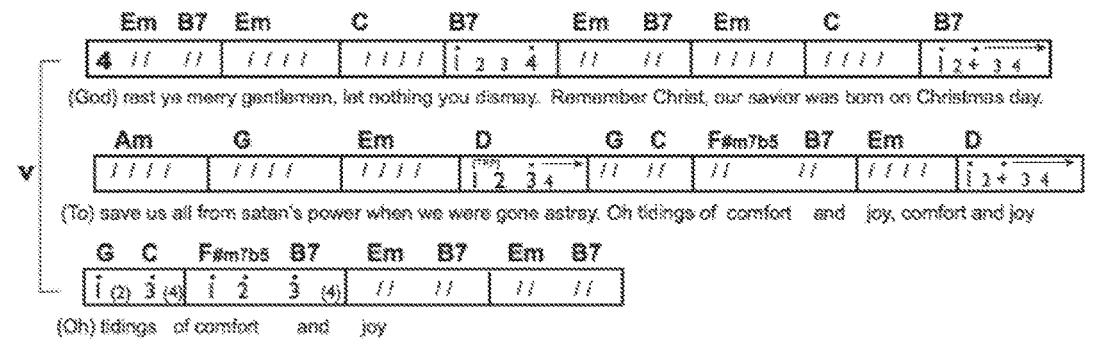

'Simple Notation' system is shown in FIG. 1.
Chord-only system is shown in FIG. 2.
'Simple Number' system (variation 3) is shown in FIG. 3.
'Simple Number' system
(variation 1 on top two lines, variation 2 on bottom line)
is shown in FIG. 4.
Standard sheet music is shown in FIG. 5.

Further Example: 'it is Well with My Soul'

Figure 6:
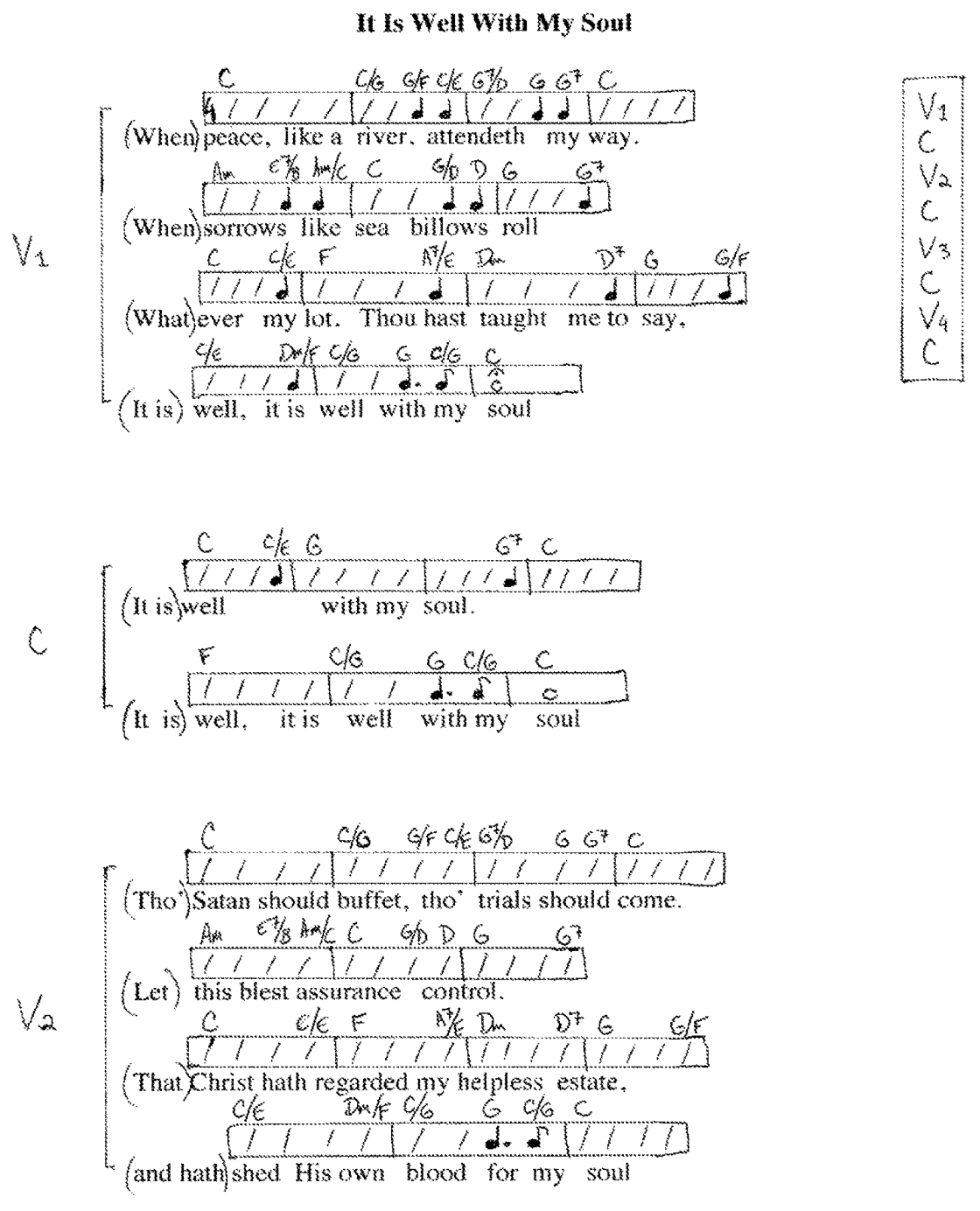
Figure 8:
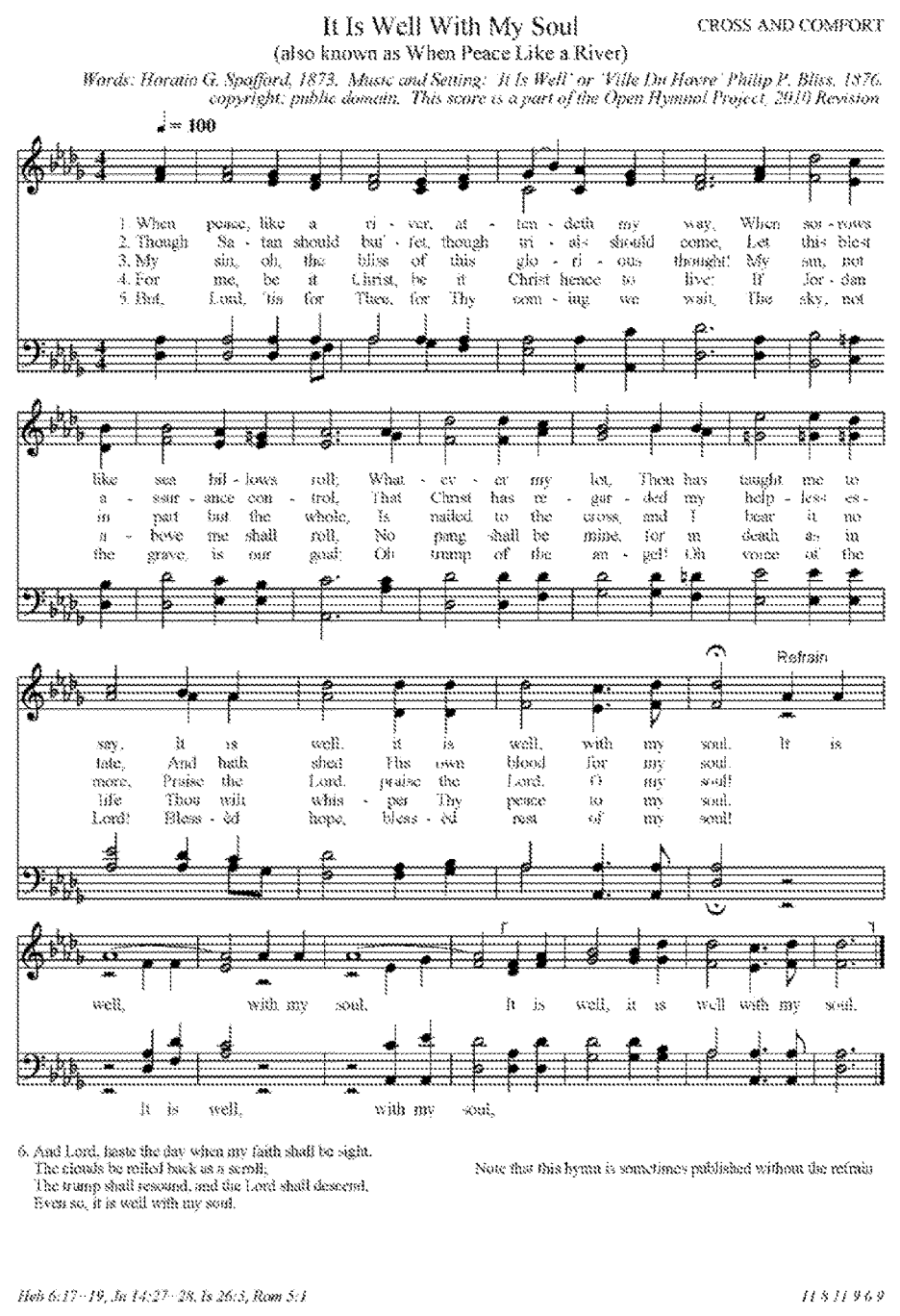

The song 'It Is Well With My Soul' is included as another example chart, this time in a full format. See FIGS. 6 through 8. The overall format and included components are the standardized elements from the comp chart system. Each verse section, however, is utilizing a different sub-system of notation, for the sake of demonstration. They are itemized in the following paragraphs.

This song was chosen not only because it is licensed as a public domain piece, but also because it is such a chord-heavy song that it proves to be a perfect candidate for the comp chart system. The song is divided into 'verse' and 'chorus' sections (a 'chorus' section would have traditionally been called a 'refrain'), and arranged as such.

The basic comp chart elements that are included in each section are as follows:
Bolded beat number at the beginning of the tune (this is not used in subsequent sections due to the fact that it does not change throughout this particular piece)
Compressed (comp') staff is utilized between the chord symbols and the lyric lines
Left-margin brackets and labels are used on each section
A grid with song flow is included in the upper right of the first page
All syllables that occur prior to the downbeat of each line are in parentheses
Most of the words and/or syllables of the lyrics occur roughly underneath the correct beat placement in each measure. This is not critical, since the word placement is no longer used to determine specific rhythmic notations.
Verse 1:
This first verse utilizes a version of the 'simple notation' sub-system. All chordal notation that is not specific to a particular rhythm, and is longer than one beat in duration, is notated using the "/" (backslash) for each beat. This is understood to correspond with a beat per backslash while not specifying what rhythm should or must be played. Any rhythm deemed acceptable by the musician or director is therefore allowed, with the only caveat being that the overall duration of any rhythmic pattern must conform to the lengths of any included backslashes (i.e. 3 backslashes equals 3 beats, or in other words "/ / /"=3 beats). The second measure shows 2 backslashes and 2 quarter notes, all of which equals the 4 total beats that each measure contains.

Any time that a chord only gets the value of either one beat of duration or a subdivided beat duration (i.e. eighth note, dotted quarter note, etc.) the rhythmic notation is done using the 'simple notation' system. In the case of all the chords prior to the last 2 measures, this simply means that each chord of only 1 beat in duration is marked with a quarter note "fat" note instead of a backslash. This is done in order to make timing of chord changes very clear, but is also functional in this case specifically because a typical tempo for this song would not allow for much in the way of more complex rhythms over those chords.

The second to last measure includes a more specific rhythmic pattern for the last 2 chords (in this case, a dotted quarter note for the 'G' chord and an eighth note for the 'C/G'). Whereas the previous rhythmic notations for each chord symbol were included for the sake of clarity, these particular rhythmic values cannot be precisely written using backslashes (since they are not able to be sub-divided).

The final measure includes a whole note (4 beat value) of the 'C' chord. In this case, it also includes a fermata, which is used in standard notation to indicate a note that is held for an indefinite time determined by the director (or performing musician, when no director is involved). Normally, the placement for a fermata would be above the staff. In this case, however, due to the placement of the 'C' chord symbol, the fermata is included within the staff (though still directly above the note being played, as in standard notation).

The lyrics are written in complete phrases for each line, and therefore include parentheses around the pickup note syllables at the beginning of each line. This was done in order to keep the phrases continuous, in more of a sentence format. The other option would have been to take the syllables/words that are in parentheses and include them at the end of the previous line. For example, the second line and phrase begins with the word "When" in parentheses. This technically occurs on the final beat of the previous measure, and could have been included there, which would be the very last beat of the first line/phrase (the fourth beat of the previous measure, where the word "way" would get the value of the first 3 beats). This could be done with each pickup syllable, excluding the one at the beginning of the first line, since there are no previous written measures to which it could shift backwards.

Chorus:
The 'chorus' or refrain section of the piece includes identical elements as used for 'verse 1.' The only difference is that, though the final phrase is nearly identical to the final phrase of 'verse 1' in both lyrics and rhythms, the final chord does not include a fermata (and is therefore only held for the normal 4 beat duration).

Verse 2:
This verse is presented in much the same way as 'verse 1,' though it shows another slight variation to the 'simple notation sub-system.' Instead of including note lengths for the chords which are only 1 beat in duration, it uses the "1" backslash symbol for all quarter-note rhythms. In this particular instance, the only place where a notational system must be used is for the second to last measure, where 2 of the chord durations are shorter/longer than 1 beat.

The decision to use this format variant as opposed to that used for 'verse 1' is at the discretion of the end user, since they are functionally identical. In the opinion of the inventor, the fewer chord changes per measure, the easier it is to justify using only the backslashes for single beat values. If many chord changes are used, there is increased justification for using the notation values, since, from a practical standpoint, it "reads better." The main caveat to this debate is that if the chords are truly meant to only be played once and held for the duration of 1 beat, then writing with notation for each of those chords is more specific than using backslashes. This is because though a backslash has the value of one beat, any rhythm is theoretically acceptable as a subdivision over that beat value (i.e. a strumming pattern played by a guitarist that includes some combination of smaller-than-quarter-note subdivisions, but is only played for the duration of one beat for that chord). The faster the tempo of a song, the less likely a player will use a complicated strumming pattern for any chord of single beat duration, since it is less practically applicable. The discussion of practicality in these areas is very much an opinion, and should be regarded as such. Therefore, both options are presented as equal in both function and use.

Verse 3:

This verse is also presented in much the same way as the previous verses, though it utilizes a version of the 'simple number sub-system' instead of another variant of a notational system. For comparison's sake, it is the 'simple number' equivalent of the 'simple notation' variant used for 'verse 1.' This is because the chords that have only 1 beat of duration are written using the numbered sub-system (as opposed to using backslashes for all single beat chords). It is the opinion of the inventor that using any of the 'simple number' sub-system variants in this way is not as "readable" in a practical context. It seems that this system is better utilized when all chords of single beat duration also use backslashes, and the numbered system is only used for notations where the chord/note lengths are of longer or shorter durations (i.e. eighth notes, dotted quarter notes, half notes, etc.). It is included for the sake of completeness, and also because there are instances where it may be preferred, even if it is more complex to read.

Verse 4:

This last verse utilizes the identical 'simple notation' variant that is used for 'verse 2.' The only difference is the pickup syllables are presented in another way (as outlined in the explanation for 'verse 1'). Specifically, all the lines/phrases begin with pickup syllables in the previous verses. Here, each line has the pickup syllables included at the end of the previous line (where they technically are based on beat placement). The only one that is not like that is the first line, since (as stated before), there is no previous measure of which to shift that syllable. It is technically occurring over the last beat of the last measure of the 'chorus' and is therefore not practicably able to be written there.

The decision of where to shift the pickup syllables for each phrase or line is entirely up to the discretion of the arranger. There is functionally no difference between the two formats, and since the lyrics do not always line up exactly with the chord changes, the measure markings and notation gives a much more precise rhythmic direction. This is, indeed, one of the most core elements of the comp chart approach. It normally includes the lyrics for reference, but the lyrics themselves do not show where specific rhythmic elements occur. The compressed staff, measure markings, and notational system that is used, all provide vastly superior and more specific direction.

Comp Chart Proof (Simple Notation)

This proof will show the application of the charting format version 'simple notation' in accommodating and re-harmonizing a song written in standard notation, as well as sub-system variants of this 'simple notation' system ('simple number,' etc.).

It is of note that the building block of the format is a three-tiered setup: the compact or compressed staff which includes all rhythmic information, chord symbols above the staff in positions directly relating to the rhythmic information within the staff, and the lyrics written underneath the staff. A labeling element is also included, though may not be used for simple choruses, etc.

The included standard notation chart is a version of the traditional English carol 'God Rest Ye Merry Gentlemen' (which is referred to as the "original" in this document). There are no chords symbols listed, though some basic harmony is implied due to the voice parts. That said, the way re-harmonization is normally approached is to keep only the main melody (in this case, the soprano voice part, which is the highest written part) and then apply either variations of the original chords, or completely new ones. In this specific case, we'll be approaching the process from the variation or embellishment perspective, though this charting system can accommodate any chord variants.

The first element to address is that the original is in 4/4, or what is known as "common time." For the purposes of the 'simple notation' format, we need only make note of the number of beats in each measure, which in this case is 4. This, then, becomes our 'beat number' for the new chart. This is positioned at the start of the first measure, and placed within the compact/compressed staff (which has no staff lines). If the time signature were to change at any point, a new 'beat number' would be inserted into that measure, and would continue until indicated otherwise (which is also the way standard notation is done, albeit with time signatures themselves).

The second element to address is the harmonic rhythm (in layman's terms, when each chord changes). Because the original has no chords listed (they are only implied by the vocal harmony), the new chords have no direct visual reference to the original. They do, however, work seamlessly with the main melody, and imply a very similar tonality and harmonic rhythm to the original.

Additionally, included rhythmic notation (using standard notation elements) is applied within the measures, though it deals only with the chord/harmonic rhythm. Again, these elements are at the discretion of re-harmonizer, since no specific chords were included in the original. Because this particular re-harmonization utilizes some rests and specific rhythms, these are written out within each appropriate measure, and apply to the chord they are beneath. The slashes imply a quarter note rhythm that is not written using standard notation, but any rests, notes longer or shorter than one quarter note, or other rhythms (like the triplet rhythm in the $12^{th}$ measure, under the 'D' chord) utilize standard rhythmic notation in each individual case. If only slashes are included, the rhythmic variations are at the discretion of the player, though a quarter note pulse is generally implied (as with standard 4/4 material). The values of all of these standardized notation devices are identical to normal use outside of this system (i.e. a half note or a quarter note rest, for instance, both have the same note value as they do in standard notation). Examples of this on the 'simple notation' chart would be measures 4, 8, 12, etc.

The other slight variant of the rhythmic device used is placement of the slashes. When possible, slashes are grouped slightly, so that their placement under the correct chord symbol is obvious and easy to read. Examples of this are in measures 1 and 5, where the 2 beat (2 slash) value for the 'Em' chord is cleared grouped and separate from the similar 2 beat value for the 'B7' chord which follows it.

The third element to address is how the lyric lines must be written. Because the 'simple notation' system does not attempt to apply any specific rhythms to melodies that are sung and not played, the lyrics are simply positioned in roughly the same area as the chords with which they occur. Because the song is only modestly verbose, the sizing of measures within the 'simple notation' version does not require much variation. If many more lyrics would be included in each measure, the measures themselves would have to be stretched to accommodate that.

The one rhythmic element that is included with the lyrics deals with the first measure of the original. It can be seen that this first measure is not complete, and contains only one beat of the melody. This is often referred to as a "pick-up note(s)". The 'simple notation' system deals with this by putting any words and syllables that are connected with these pick-up notes within parentheses. This is a non-negotiable element at the beginning of any song, though it can be used at any transition (whether line or section) for clarity of phrasing. In this particular case, the beginning syllable for each line is included in parentheses, as it was deemed easier to read by this author. That approach is not required, and those syllables could have been included at the end of the previous line.

Also included in the 'simple notation' version is a labeled bracket to the left (labeled with a 'V'), which denotes that this is a verse section of the song. In this particular case, this element could have been omitted, as only one verse is included, and it comprises the entirety of the song format. Any and all additional verses are vocally identical, and would be written at the discretion of the re-harmonizer/transcriber.

The above-mentioned elements comprise all of the essential parts for a 'simple notation' version of a chart. Because of this, all additional elements from the original are omitted. This includes the time signature, key signature, staff lines, and any melodic content. Some of these elements could still be included in the 'simple notation' version, but they are deemed generally unnecessary, and would only be included at the discretion of the re-harmonizer/transcriber.

Some other standard notation elements may still be included at the discretion of the re-harmonizer/transcriber, though they are absent from this particular chart. Denotations for repeats would be one example, as would any dynamic markings.

One additional element is recommended, though not required, for use with the 'simple notation' system, and that is the utilization of a song section grid. This is a quick reference for the flow of the song from section to section, which is normally included in the top right corner of a document, and utilizes the abbreviated symbols for the sections of a song (V for verse, C for chorus, etc.). An example of this is included with the chart for "It Is Well With My Soul."

If no original written document exists, or if there is no access to it, a 'simple notation' chart can be created through aural transcription. This is an extremely common method that is used with any and all existing chord chart formats, and is a fantastic application for a 'simple notation' chart.

The included chart for "It Is Well With My Soul" provides additional examples of this 'simple notation' system in practical use. It's a chart that mixes various sub-systems, but is built primarily around this 'simple notation' system, and incorporates it into multiple verses.

Variation A:

The initial variation of the 'simple notation' system is the 'chord-only' system. Basically, it is just a streamlined version of the main system. The only difference is that there are no rhythmic values given within the measures at all. Interpretation of the rhythmic parts is then left up to the individual musician. Though not as powerful, it can be helpful for some individuals who appreciate an even simpler visual on their charts, while still retaining the other functional elements.

Variation B1:

This variation is called the 'simple number' system, and is distinct in that it incorporates all of the elements of the 'simple notation' system, but replaces the use of standard notation devices within the measures with a number system (of which there are 3 sub-variants, labeled as "variation 1, 2, or 3").

As with the 'simple notation' system, the same process is applied to any original version. So, the approach here would be to simplify time signature and change it to just a 'beat number' which is placed at the beginning of the first measure within the compact staff. Next, chords are positioned in their correct places, and slashes utilized for all general rhythms. But instead of using standard notation for any specific rhythms, the first variant of the 'simple number' system is implemented (this is shown in the top 2 lines of the variation labeled "variation 1"). This sub-system utilizes a consecutive number for each beat within a measure, beginning with one and continuing up until the end of that measure. Each measure then would begin again with one. When specific beats are necessary within a measure that already uses slashes for some portions, the numbers start on next successive beat (i.e. a rhythmic marking on the $3^{rd}$ beat of a measure would begin with the number 3). This particular example is not included in this chart, but can be used at the discretion of the re-harmonizer/transcriber.

Notes that are played have a "." (dot) above them, and ones that are rests do not (though they still have a number listed). Measure 4 is an example of this use. If a note is held, an arrow is also drawn above that number, and held for the duration. An example of this is measure 8, where an arrow is placed above the "and" of the second beat, and held for the duration of the measure. Also, any non-standard note groupings can be identified with markings such as "TRP" (triplet), as shown in measure 12.

Once all rhythmic elements are finalized, lyrics are included in the same fashion as in the 'simple notation' system.

Variation B2:

This is the second of the 'simple number' variants, and works identically to the first variant in every way except one. The only difference is that non-played (or rested) beats are marked with parentheses. The bottom line of the included example marked "variation 2" utilizes this sub-system.

Variation B3:

The final variant of the 'simple number' system is identical in form to the first two variants, but omits an numbered beats which are not played. Measure 4 in the chart labeled "variation 3" is an example of this, in that the only beats/numbers written are the ones which are played (the first and fourth beats, in this case).

Variation C1:

This variation is essentially a bridge between either the 'simple notation' or 'simple number' systems, and one of the standardized notation systems. The first option would utilize a section of standard melodic/harmonic notation which is included within one of these 'simple' systems for a finite number of measures, at which point it reverts back to the 'simple' system again. The diagram marked "example 1" shows one version of this. 2 measures of a specific melody using standard notation and standard staves are included at the end of a line of a 'simple' chart. Though the example ends there, a subsequent line would return to the 'simple' chart form unless more melodic content was written. This content is seen as clearly melodic due to the use of a standard notation staff complete with staff lines, and cannot be confused with the rhythmic notation from the 'simple notation' system, which only occurs within the compact staff without staff lines. Extremely useful for specific melodic lines that could not be included in any sort of non-standard notation chart, and there is no minimum or maximum length for any standard notation section.

Variation C2:

This variation is identical to the previous version (C1), but utilizes guitar tablature instead of standard notation. So, in place of a standard measure, a 6 line guitar tablature section is included. This is also split into measures like standard notation, and can even include rhythmic values listed above each note. The diagram marked "example 2" shows this tablature version. As with the previous version which used standard notation, it is assumed that this chart would revert back to whichever 'simple' system was being utilized prior to the tablature section. There is, however, no minimum or maximum length for any tablature section.

Variation D:

Less of a variation than a separate element which can be included or excluded from any of the 'simple notation' or 'simple number' comp chart variants. Labeled the 'style library,' it is format method that allows a labeling system which can reference rhythmic styles, genres, etc. much quicker than writing out specific rhythms themselves. A labeling system consisting of a letter and number combination which references a specific rhythm or groove contained in a library index is utilized, and separate sections (as large or small as necessary) can be marked in this way. The references can be written, audio, or video examples. Primarily intended for drummers/percussionists, the 'style library' can still be used for any instrument, providing there is a library of rhythms and grooves that has been assembled for each. The included example chart is "Majestic," which is itself a 'simple notation' version of that piece. Since 'style library' delineations are not included in any form within standard written charts, there is no "original" chart to include. In this example, the style references are specifically intended for drums/percussion.

In the chart, the "intro" section has a particular percussive rhythm, marked here as "A5." This references a theoretical library section of "A" (genre or type), and then "5" (specific variation). See attached section labeled "Suggested Style Library Template" for further examples.

The "verse" section of this chart utilizes a different rhythm/groove, and is marked as "A9." This would reference the same general section of the library, but a different specific pattern. Because the "chorus" section is very similar to the "intro" section, the same groove is suggested for both ("A5"). Should a song be more complex, there are limitless variations of how this 'style library' can be implemented. The most powerful aspect of this system is that the library itself is unique to the end user or group, hence it's presentation as more of a template.

TABLATURE AND NOTATION EXAMPLES

One of the other elements that is included with the comp chart format/system is the possible inclusion of traditional staff notation and/or tablature (guitar/bass-specific notation) sections of a chart which is otherwise based on the compressed staff of the typical comp chart. There are many instances where a specific line needs to be played, and the only way to include this has been to use a standard notation staff for everything. The included examples show how easily both standard staff notation and/or tablature can be used anywhere deemed necessary within a comp chart, without compromising the benefits or format of the comp chart itself.

Both examples are identical in function, but presented in different formats. No lyrics were included in these diagrams, but they can always be included or excluded at the discretion of the arranger without affecting the function of the chart.

Example #1

The first example utilizes a typical comp chart format for the first three measures, and then includes two measures of standard staff notation. The comp chart's included beat number establishes the basic format (4 beats per measure) and chord symbols show the standard chord changes for the first three measures. For the two measures of standard notation, a clef is provided (in this case, a "G" or treble clef). Both a key signature and time signature are, however, omitted.

The time signature is considered unnecessary because the beat number from the comp chart section established a 4 beat per measure format that does not change when transitioning into the traditional staff measures. If it did, a time signature could be included. In the interest of space and cleanliness, however, it is omitted here, and deemed unnecessary. The same is true of the key signature. In this case, the key is actually 'C' and therefore wouldn't have any sharps or flats written as the key signature, regardless. But once again, in the interest of space, it is suggested (though not required) that a key signature be omitted entirely (when feasible) and accidentals used for any notes that require them. This is at the discretion of the arranger. Also, no chord symbols are included above these two measures, since the line is meant to replace any chordal playing. These could also be included at the discretion of the arranger, since certain instruments may be meant to stay with a chordal rhythm part while others play the included notation line.

The two measures of staff notation are essentially "dropped" into the comp chart, and the format can resume immediately afterwards. In this same way, there is no limit to how many sections of standard notation may be included in any given chart, and they may be used as many times as is deemed necessary by the arranger. They may even be used at the beginning of a line (or the entire chart), as long as the format is clearly defined. This gives great power to these charts, since they can include specific information that is otherwise not available in a 'chord and lyric' chart format, while not having to use the added space and large amounts of unnecessary information that typically accompanies a standard notation chart.

Example #2

The second example is identical in function to the first, and thus the formatting elements are all the same for the first three measures. The last two measures are written in tablature (specifically 6-string guitar tablature, in this case). Both bass-specific tablature (which is also common) or tablature for other stringed instruments (banjo, mandolin, etc.) may be utilized instead.

Tablature is a specific type of notation that attempts to show physical locations of notes on a stringed instrument. It is still read left to right, in the same way as standard notation. Many times, tablature does not include time signature designations at all, and rarely does it include any note durations. In the included example, the time signature is deemed unnecessary for the same reason as was cited for 'example #1' above. It could be included any time where it would be deemed necessary by an arranger, although anywhere where a time signature might be required would be equally served by use of a beat number, especially since this would be occurring within the format of a comp chart.

For rhythmic values within the tablature section, there are multiple options for further information. The included method is to use the 'simple notation' format normally found in a comp chart and place it directly above the tablature (each note value then corresponding to each number placement within the tablature). The 'simple number' format could also be used, at the discretion of the arranger, though this is deemed not as strong of a use for that sub-system by the inventor.

As in 'example #1,' any number of these sections of tablature may be included in a comp chart, determined only by the discretion of the arranger. See FIG. 9.

Style Library and Index System

A final component that is included in this system is what we call a "style library" or "style index." It can be used with any version of the previous systems with no modifications, though it will not be necessary in all cases, and is therefore presented as a separate component in this way.

Style Library and Index System uses a simple system of letters and numbers that act as a symbol, and refer to a specific style or rhythmic approach for any given section of music. This can either have a written component (as in standard sheet music, or percussion charts), or a recorded reference (any type of sound recording, video, etc.) which are referenced separately from any charts, in an indexed library format. In this way, the specific label carries a large amount of information that would be well beyond the scope of what could be included in any charting system in its full presentation. This is of immense value to drummers/percussionists, but also works well for guitarists, keyboardists, etc., because of the ease of reference and the streamlined presentation of so much information through a simple symbol formula.

The initial letter designation would correspond with a particular rhythmic family, or general stylistic classification, and then the number would denote a more specific variation within that general classification. Further variations would be possible, if an expanded library is necessary.

For example, one such label may be 'A5.' In this case, 'A' would represent a basic style family, and '5' would represent the specific pattern or musical feel. 'A' could denote a pop music style rhythm, for instance. '5' would then be a specific version of that general feel. So, 'A5' would reference a particular rhythmic pattern, which could be referenced in either its written form, or through some recorded media. This designation would then be included in any part of the comp chart where a specific style is requested or suggested. A verse may have a designation of 'B2' (referencing a certain style and pattern), and then a chorus may have a completely different designation, due to a style shift in that part of a song (perhaps 'D7'). The labels are somewhat arbitrary, in that the user of this system chooses what to include in this library, and therefore it is presented here without specific recommendations in terms of what style family to label as 'A,' 'B,' etc.

As previously stated, the largest implication is for drummers or percussionists, seeing as other charts in this style have virtually no information for those instruments. It would follow, then, that some of the additional information included in a standard comp chart presentation could even be excluded for these specific drum charts, so as to streamline presentation. Drummers have no need for chord or key designations under normal circumstances, and may prefer that they are excluded from the final version of the percussion chart for the sake of ease of use.

If used for guitars, keyboards, etc., the index numbers can simply be included within the normal comp chart. Depending on the style, these may not be necessary, as any rhythms already written within the standard rhythmic system may contain all pertinent information. This is at the discretion of the end user.

Suggested Style Library Template:

(Alphabet character indicating general stylistic/rhythmic category)

(Alphabet character followed by number denoting specific example)—(included media link)

(song section) (time stamp)

Examples

A—Rock Rhythms

A1—(link to specific audio/video file)

verse rhythm, beginning at 1 m45 s

A2—(link to another specific audio/video file) chorus rhythm, 2 m11 s-2 m36 s

B—Pop Rhythms

B1—(link to specific audio/video file)

intro groove, 0 m1 s-0 m20 s

B2—(link to drum rhythm chart)

similar to verse rhythm in (popular song reference)

etc.

Figure 10:
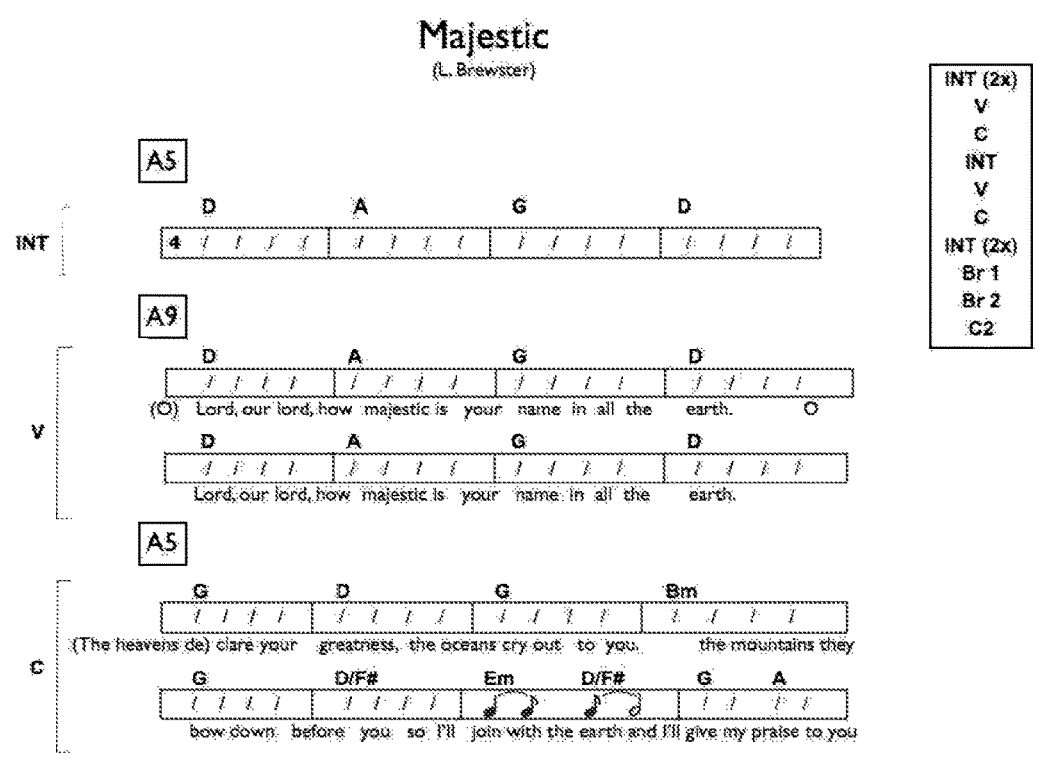

See FIG. 10.

In broad embodiment, the present invention is a music notation or charting system and method. While the foregoing written description of the invention enables one having ordinary skill to make and use what is considered presently to be the best mode thereof, those having ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A method of creating a new music chart from a standard chart which comprises:

(a) determining a time signature of the standard chart and displaying it as a beat number format wherein only a number of beats in each measure is shown at the beginning of each line of music in the new music chart;

(b) determining measure placement of the standard chart and displaying it as a compressed staff format wherein staff lines and key signatures are no longer shown;

(c) determining a harmonic rhythm of the standard chart and displaying chords in identical places within the new chart wherein the cords are placed directly over a beat or portion of a measure on which they occur;

(d) determining a lyric placement relative to each measure, including pickup measures, at the beginning of the standard chart and parenthesizing words or syllables within a pickup measure wherein words or syllables within the pickup measure are parenthesized to the left of the first full measure and all additional words or syllables are displayed underneath the measure and chord with which they occur;

(e) determining if a section of the standard chart functions as an introduction, verse, pre-chorus, chorus, bridge, outro, elision, instrumental solo, or ad lib and bracketing each section of measures within the new chart wherein a bracket is displayed to the left of each section of measures that are grouped together by function;

(f) labeling each bracketed section of measures within the new chart with one or two letters to indicate the function of the bracketed measures; and (g) determining a rhythmic content in the standard chart and displaying the rhythmic content in the new chart using chord rhythm slashes wherein slash marks are displayed underneath any chord to be played and slash marks are displayed any time a more specific rhythm is not implied.

2. The method of claim 1 further comprising marking the rhythmic notation for any sections which require specific rhythmic information beyond the slash marks by displaying standard music chart notational elements, but with all rests displayed as individual beats.

3. The method of claim 1 further comprising displaying one or more concurrent measures-worth of either standard music notation or tablature into any line or section of the new music chart.

* * * * *